(12) United States Patent
Sullivan et al.

(10) Patent No.: US 6,409,591 B1
(45) Date of Patent: Jun. 25, 2002

(54) AUTOMOTIVE VEHICLE EXHAUSTER VENT

(75) Inventors: Thomas M Sullivan, Highland; Kenneth R Lochner, Allen Park, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/874,645

(22) Filed: Jun. 5, 2001

(51) Int. Cl.[7] ................................................. B60H 1/24
(52) U.S. Cl. ..................................... 454/164; 137/512.1
(58) Field of Search ................................. 454/162, 164, 454/165; 137/512.1

(56) References Cited

U.S. PATENT DOCUMENTS

| 4,549,762 A | 10/1985 | Burk et al. |
| 4,995,447 A | 2/1991 | Weidmann et al. |
| 5,573,299 A | 11/1996 | Masuda |
| 5,706,170 A | 1/1998 | Glovatsky et al. |
| 6,047,786 A | * 4/2000 | Stevenson et al. ......... 180/65.1 |
| 6,081,964 A | 7/2000 | Mori |
| 6,120,091 A | * 9/2000 | Reich et al. ................. 296/214 |

FOREIGN PATENT DOCUMENTS

JP        8-80741     *  3/1996

* cited by examiner

Primary Examiner—Harold Joyce
(74) Attorney, Agent, or Firm—Edwin W. Bacon, Jr.

(57) ABSTRACT

An automotive vehicle is provided having a car body including in a preferred embodiment a passenger compartment and a trunk compartment. The passenger compartment has a vent communicating with the trunk compartment and has compressible fluid communication with the same. The vehicle has a ventilation system for inducing pressurized air into the passenger compartment. Air is exhausted from the trunk compartment through a one way vent to an exterior of the vehicle. The vent additionally sealably mounts a conduit for moisture, vapor vents or wiring harnesses.

15 Claims, 2 Drawing Sheets

AUTOMOTIVE VEHICLE EXHAUSTER VENT

FIELD OF THE INVENTION

The present invention relates to automotive vehicles with ventilation systems and more particularly, automotive vehicles with exhauster vents that also mount sealed conduits that mount wiring harnesses and/or fluid vents.

BACKGROUND OF THE INVENTION

Virtually all vehicles manufactured today have a heating and ventilation system for the passenger compartment of the vehicle. Virtually all vehicles manufactured in North America also come equipped with an air-conditioning system. To facilitate the environmental health and comfort of the vehicle occupants, fresh air must be brought into the vehicle interior passenger compartment. The passenger compartment of an automobile generally has a size of 2 to 3 $m^3$. In order to cool the passenger compartment in warm weather, 300 $m^3$/hr of ambient air or air cooled by an air conditioning system is guided through the compartment.

Such a high rate of air flow results in many air changes. Several technical challenges are presented in bringing fresh air into the vehicle. First, the fresh air intake should be located in an area of the vehicle where it cannot suck in any fumes. Second, the fresh air intake should be located where snow or frozen precipitation cannot clog it. Finally, the air intake should be protected from precipitation, leaves and other various debris entering into the heating, air-conditioning and ventilation system.

The engine compartment of most vehicles is in the front end of the vehicle. Behind the engine compartment is the passenger compartment which is separated from the engine compartment by a fire wall. Above the fire wall and inclined rearwardly from the top of the fire wall is the windshield. Extending forwardly from the base of the windshield and on top of the fire wall is a generally flat region called the cowling. The cowling is covered by the rear portion of the front hood which also extends across the engine compartment. The lower portion of the hood has a molding which seals the engine compartment from the remainder of the cowling. However, the front hood is spaced away from the windshield allowing air to enter into the cowling area from behind the front hood.

Typically, the air intake for most vehicles is placed in the cowling area since the cowling area is opened to the atmosphere and covered by the front hood, but yet sealed away from the engine compartment by the front hood molding. The cowling typically has a flared opening for the air inlet of the heating, ventilation and air-conditioning system. The air inlet pipes air into the passenger compartment below the dashboard where it is appropriately heated, cooled and/or filtered to meet the environmental and comfort requirements of the vehicle occupants.

To allow for the proper exchange of air within the passenger compartment there must be an air flow through the passenger compartment. Most automotive vehicles are constructed such that the passenger compartment is generally sealed from the outer environment to the extent that air within the passenger compartment cannot escape. Accordingly, air from the passenger compartment is typically vented to the trunk through vents located near the package shelf.

The flow of air from the passenger compartment to the trunk compartment is desirable for several reasons. It is desirable that there be positive air pressure within the passenger compartment to cause air to go through the trunk compartment so that the trunk compartment, which is typically neither heated or cooled, maintains a temperature closer to the selected temperature of the passenger compartment. It is desirable that the passenger compartment have a higher air pressure rate than the trunk so that fumes, moisture or odors which may enter into the trunk from either outside the vehicle or from things stored inside the trunk do not enter into the passenger compartment.

To allow for the continuous flow of air from the passenger compartment into the trunk compartment, an exhauster must be provided. An exhauster is a vent that acts as a check valve to relieve air that is delivered into the trunk compartment from the passenger compartment to the exterior of the vehicle. Additionally, the exhauster also functions to relieve pressure when the doors, trunk or cargo hatch of a vehicle are closed. The pressure relieving function of the exhauster is vital to passenger comfort and to the prevention of glass damage to the vehicle.

Typically, the exhauster is provided by an aperture in the car body. The aperture is enclosed with a vent. The vent typically forms a check valve function to assure egress of air or moisture from the trunk compartment but not to allow the ingress of air into the trunk compartment from the exterior of the vehicle.

The exhauster is commonly located in the rear wheel well or in the rear trunk region adjacent to the rear bumper and concealed thereby or adjacent to the exterior trim (fascia) and concealed thereby. In vehicles with integrated passenger and cargo areas including, but not limited to, station wagons, vans, minivans, hatchbacks, trucks and sport utility vehicles, air flow from the integrated interior of the vehicle is released to the exterior of the vehicle via the exhauster.

The automotive body in the trunk compartment (or body enclosure for vehicles with integrated passenger and cargo areas) has additional holes for other conduits to pass therethrough. One conduit will be the wiring harness. Other apertures will be placed in the trunk compartment to allow for the removal of precipitation from an area surrounding a powered sun roof and other items such as a battery vent in vehicles having batteries placed in the interior region of the vehicle. The addition of various holes to the car body is disadvantageous for several technical reasons. The additions of holes to the vehicle body adds to the manufacturing cost of the vehicle. Additionally, apertures penetrated in the car body provide more opportunity for corrosion. Apertures in the car body can sometimes damage the wiring harness when the wiring harness is threaded through the aperture and can sometimes lead to an inadvertent stripping away of the insulation which surrounds the wires of the wiring harness. The smaller the hole in relation to the wiring harness, the greater the chance of damage to the wiring harness.

It is desirable to eliminate those holes necessary in the car body to facilitate routing the wiring harness, sunroof drain tubes, or exhaust tubes. Alternatively, it is desirable to reduce the needed apertures to a minimum number as economically feasible.

SUMMARY OF THE INVENTION

To make manifest the above desires, a revelation of the present invention is brought forth. In a preferred embodiment, the present invention brings forth an automotive vehicle which has a body. The automotive vehicle body includes a passenger compartment and a trunk compartment. The passenger compartment provides a first generally sealed control volume. The trunk compartment provides a second control volume. The trunk compartment has compressible fluid communication with the passenger compartment. The car body has an aperture which communicates the trunk compartment with an area immediately adjacent the exterior of the car body.

The automotive vehicle includes a ventilation system. The ventilation system induces into the passenger compartment a pressurized air flow. A vent is mounted within the car body aperture. The vent allows one-way air transfer from the trunk compartment to an area adjacent the car body exterior. The vent additionally sealably mounts a plurality of sealed conduits to allow passage through the aperture and the vent.

It is the feature of the present invention to provide an automobile with an exhauster vent which additionally mounts conduits for passage therethrough.

Other features of the invention will be more apparent to those skilled in the art upon a reading of the following detailed description and upon reference to the drawings.

BRIEF DESCRIPTION OF THE INVENTION

DETAILED DESCRIPTION OF THE INVENTION

Figure 1:
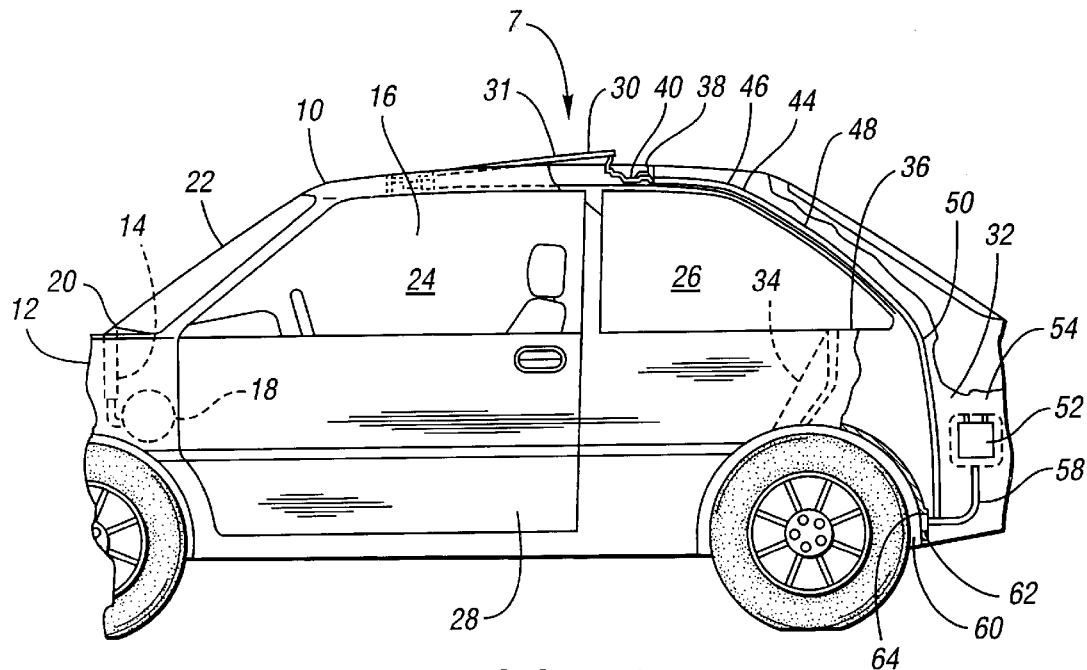
FIG. 1 is a side elevational view, partially sectioned, of an automotive vehicle according to the present invention.

Referring to FIG. 1, an automotive vehicle 7 according to the present invention has a car body enclosure 10. The car body 10 has a frame (not shown) which it is connected onto. Adjacent a front end of the car body 10 is an engine compartment 12. The engine compartment 12 at its rear end is bordered by a fire wall 14. The fire wall 14 forms a forward border for a passenger compartment 16.

Mounted within the passenger compartment 16 in an area underneath a dashboard (not shown) is a heating, ventilation and air conditioning system motor 18. The motor 18 induces pressurized air into the passenger compartment 16 from the cowling (not shown) of the vehicle. The cowling is adjacent a lower end 20 of a front windshield 22.

The passenger compartment 16 includes a generally sealed first control volume of 2–3 cubic meters. When the front windows 24, rear windows 26, door 28 and sun roof 30 are closed, the passenger compartment 16 is a generally sealed control volume.

Sealably divided from the passenger compartment 16 is a trunk compartment 32. The trunk compartment 32 provides a generally sealed second control volume. Rearward of seat back 34 of the vehicle second row seating at approximately a belt line height is a package shelf 36. The package shelf 36 has vents therein which allow for compressible fluid communication between the trunk compartment 32 and the passenger compartment 16.

The sun roof 30 a window panel 31 and has an encircling frame 38. The frame 38 has a drain trough 40. The drain trough 40 is connected with a drainage tube 44 in a manner similar to that shown and described in U.S. Patent Application Poliskie, Interior Trim Support Panel With Incorporated Sun Roof Drain, Ser. No. 09/309,136, filed May 10, 1999 U.S. Pat. No. 6,189,961. The drainage tube 44 has a hose portion 46. The hose portion 46 is fluidly connected with a C-panel trim integral path portion 48. The trim portion 48 is fluidly connected with a lower hose portion 50. There can be any number of drain tubes but typically two drain tubes are provided rearward in the vehicle.

Some vehicles have a battery 52 mounted within the vehicle interior to free more space in the engine compartment 12 and to allow for easier access when electrically jumping another vehicle. The battery 52 is enclosed by a battery compartment 54. The battery compartment 54 prevents any fumes which may inadvertently leak from the battery from entering the trunk compartment 32. Connected with the battery compartment 54 is a battery vent line 58.

Figure 2:
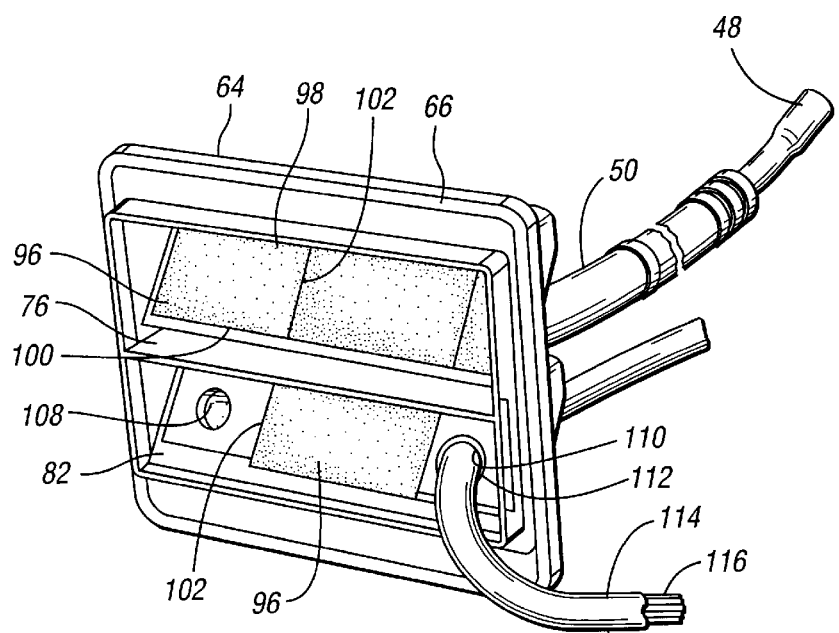
FIG. 2 is an enlarged view of a vent according to the present invention with the remainder of the vehicle being removed for clarity of illustration.
Figure 3:
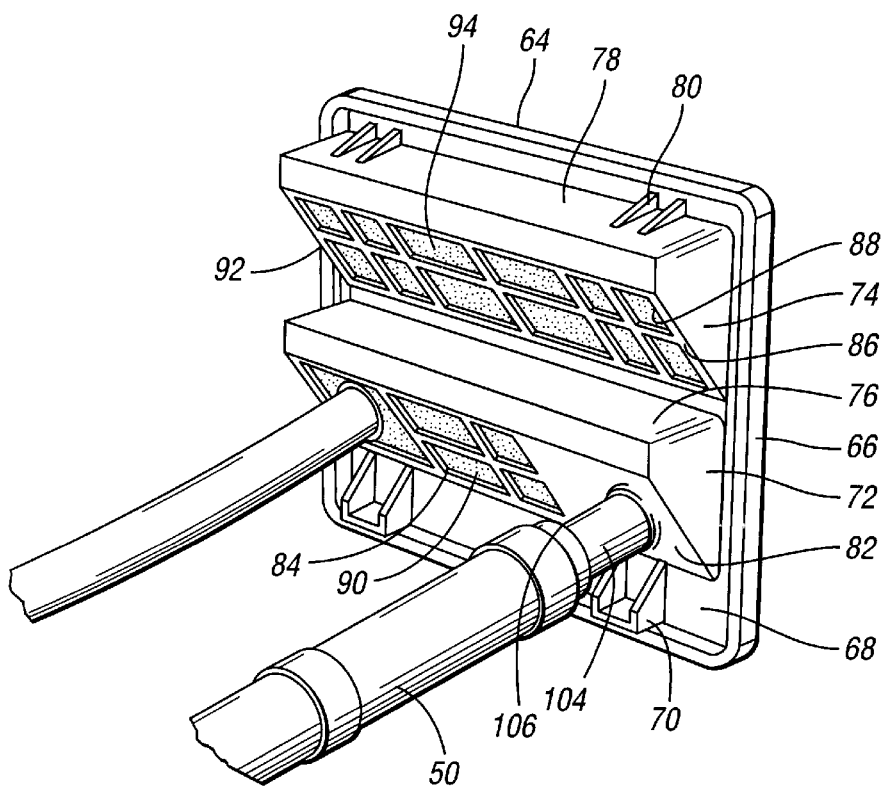
FIG. 3 is a rear perspective view of the vent similar to that shown in FIG. 2.

The vehicle 7 has a rear wheel well 60 that has a forward facing aperture 62. In other embodiments not shown, the aperture may be located towards a rear of the trunk region or other locations where it may be readily hidden by exterior trim. Mounted within the aperture 62 is a vent 64. Turning to FIG. 2, the vent 64 has an encircling frame 66. The frame 66 encircles a planar portion 68. The planar portion 68 along its lower end has two generally U-shaped cross-sectional bases 70. The bases 70 fit the vent along its lower end within the aperture 62. The planar portion 68 has integrally connected thereto a lower incline pocket 72. The pocket 72 has a generally horizontal portion 76. A pocket 74 also has a horizontal portion 78. The horizontal portion 78 has on its opposite longitudinal sides a pair of wedge ramps 80. The vent 64 can be snapped in with hooks, retained with screws, or held with interference fit or a combination thereof. The pocket 72 has an incline wall 82. The incline wall 82 has an aperture 84. In a similar manner the pocket 74 has an incline wall 86. The incline wall 86 has an aperture 88. The aperture 84 is traversed by a window-like framework 90. In a similar manner the aperture 88 has a window-like framework 92. The frameworks 90, 92 form window cells 94.

The horizontal portion 76 extends outwardly from the frame 66 on both sides of the vent 64. The window cells 94 are covered by a thin membrane cover 96. The membrane covers 96 adjacent their upper end 98 are fixably connected to the frameworks 90, 92. A lower end 100 of the membrane covers are not fixably connected to the frameworks 90, 92. In like manner, the membrane covers lateral slot ends 102 are free to move from the frameworks 90, 92.

The incline wall 82 has fixably connected thereto a nipple 104. Nipple 104 is fitted within an extreme 106 of the lower hose 50. The lower hose 50 can be held on the nipple 104 by a screw or spring clamp or as may be in many cases held on by interference fit. The lower hose 50 in combination with the nipple 104 provide a sealed tubular conduit allowing for the passage of precipitation from the trough 40 through the aperture 62 and through the vent 64 and onto the ground after exiting the outlet 108 provided in the incline wall 82. The vent 64 also has a second opening 110. The opening 110 has installed therein a grommet 112. As shown in FIG. 2, the grommet 112 mounts a wiring harness 114. Wiring harness 114 has a plurality of bundle wires 116 encircled by a covering sheath 118. The grommet 112 not only mounts the wiring harness 114 but additionally seals the wiring harness within the vent 64, prevents the wiring harness from inadvertently being pulled through the opening 112 and seals the sheath 118 from vibrational wear which could in-turn cut through the insulation provided for the wires 116. As shown in FIG. 1, the vent 62 vents the battery vent line 58 and the lower hose portion 50. As shown in FIG. 2, the vent 64 is utilized to connect with the lower hose portion 50 and to allow for the passage therethrough of the aforementioned wiring harness 114. In other embodiments (not shown) even more openings can be provided to allow for the passage therethrough of tubular conduits. Typically, the wiring harness after exiting the vent 64 will then have a travel path underneath the frame and branch to the required lighting fixtures which can sometimes be mounted in the rear bumper or fascia.

The ventilation system will operate the motor 18 to induce pressurized air within the passenger compartment 16. Air within the passenger compartment 16 will communicate with the trunk compartment 32 via vents in or near the package shelf 36. The pressurized air entering the trunk compartment 32 will cause the membrane covers 96 to act as flapper-like check valves. The flap valve action will cause the lower end of the membrane covers 96 to lift off from the incline surfaces 82, 86 to open up the window cells 94 to allow for the transfer of air through the vehicle body 10.

Water drained into the trough 40 will pass through the drainage tube 44 which includes the lower hose 50. Water in the lower hose 50 will then enter into the nipple 104 and exit the vent 64 through the opening 108. The battery vent line 58 will ensure against build-up of fumes or vapors from the battery 52. It is important to note that the venting of the battery compartment 54 is in no way dependent upon a positive pressure situation within the trunk compartment 32.

For clarity of illustration, a portion of the membrane covers 96 on the lower part of the vent 64 has been removed to show opening 108. (FIG. 2.) However, it is anticipated that in most applications the membrane covers 96 will be extended over the opening 108.

In applications of vent 64 where there is no sunroof, the membrane covers 96 will act as a seal over the opening 108. Accordingly, separate vents for vehicles having sunroofs and vehicles not having sunroofs will not be required. The membrane covers over the opening 108 will not interfere with the proper removal of moisture.

Another advantage of the vent 64 is that a single aperture is provided in the car body having a larger cross-sectional area. This allows a larger hole for plant process operations including wiring harnesses across the sheet metal barrier, to access and welding access. This additionally reduces the risk of damage to the wire harness and facilitates the assuming process thereby by reducing cost and increasing quality.

While preferred embodiments of the present invention have been disclosed, it is to be understood that these have been disclosed by way of example only and that various modifications can be made without departing from the spirit and scope of the invention as it is encompassed by the following claims.

We claim:

1. An automotive vehicle comprising:
    a car body enclosing a passenger compartment, said passenger compartment providing a first generally sealed control volume, and wherein said car body enclosure has an aperture communicating with an area immediately adjacent an exterior of said car body enclosure;
    a ventilation system for inducing into said passenger compartment pressurized air; and
    a vent mounted within said car body enclosure aperture, said vent having a check valve for allowing one-way air transfer from said passenger compartment to an area adjacent said car body enclosure exterior and said vent additionally having a sealably mounted sealed conduit to allow a passage through said car body enclosure aperture and vent.

2. An automotive vehicle as described in claim 1, wherein said conduit includes a wiring harness.

3. An automotive vehicle as described in claim 1, wherein said conduit includes a precipitation vent for a sun roof.

4. An automotive vehicle as described in claim 1, wherein said conduit includes a battery vent line.

5. An automotive vehicle as described in claim 1, wherein said vent has a plurality of conduits.

6. An automotive vehicle as described in claim 1, wherein said vent includes a nipple for attachment of a hose.

7. An automotive vehicle as described in claim 1, wherein said vent has a grommet encircling an opening in said vent.

8. An automotive vehicle comprising:
    a car body including a passenger compartment and a trunk compartment, said passenger compartment providing a first generally sealed control volume and said trunk compartment providing a second generally sealed control volume having compressible fluid communication with said passenger compartment, and wherein said car body has an aperture communicating said trunk compartment with an area immediately adjacent an exterior of said car body;
    a ventilation system for inducing into said passenger compartment pressurized air; and
    a vent mounted within said car body aperture, said vent having a check valve for allowing one-way air transfer from said trunk compartment to an area adjacent said car body exterior and said vent additionally having a sealably mounted sealed conduit to allow a passage through said car body aperture and vent.

9. An automotive vehicle as described in claim 8, wherein said conduit includes a wiring harness.

10. An automotive vehicle as described in claim 8, wherein said conduit includes a precipitation vent for a sun roof.

11. An automotive vehicle as described in claim 8, wherein said conduit includes a battery vent line.

12. An automotive vehicle as described in claim 8, wherein said vent has a plurality of conduits.

13. An automotive vehicle as described in claim 8, wherein said vent includes a nipple for attachment of a hose.

14. An automotive vehicle as described in claim 8, wherein said vent has a grommet encircling an opening in said vent.

15. An automotive vehicle comprising:
    a car body including a passenger compartment and a trunk compartment, said passenger compartment providing a first generally sealed control volume and said trunk compartment providing a second generally sealed control volume having compressible fluid communication with said passenger compartment, and wherein said car body has an aperture communicating said trunk compartment with an area immediately adjacent an exterior of said car body;
    a ventilation system for inducing into said passenger compartment pressurized air; and
    a vent mounted within said car body aperture, said vent having a check valve for allowing one-way air transfer from said trunk compartment to an area adjacent said car body exterior and said vent additionally having sealably mounted plurality of sealed conduits to allow a sealed passage through said car body aperture and said vent having an opening with a nipple connected thereto for connection of a hose.

* * * * *